United States Patent [19]

Brokken-Zijp et al.

[11] 4,190,705

[45] Feb. 26, 1980

[54] PHOTOGALVANIC CELL COMPRISING COMPLEXING AGENTS

[75] Inventors: Josephina C. M. Brokken-Zijp; Foppe J. Reinders, both of Amsterdam, Netherlands

[73] Assignee: Shell Oil Company, Houston, Tex.

[21] Appl. No.: 936,449

[22] Filed: Aug. 24, 1978

[51] Int. Cl.² .................... H01M 6/30; H01M 6/36
[52] U.S. Cl. ................................................. 429/111
[58] Field of Search ...................................... 429/111

[56] References Cited

U.S. PATENT DOCUMENTS 3,989,542 11/1976 Clark ........................... 429/111 X

OTHER PUBLICATIONS

U. Bode et al., "On the Influence of Sensitization of the Electron Transfer Through the Interface Zinc Oxide/Electrolyte by Salt Additions", *J. Electrochem. Soc.*, vol. 125, pp. 51–58 (1978).

H. Ti Tien et al., "The Photogalvanic Effect in a Modified Iron Thionine System", *J. Electrochem. Soc.*, vol. 125, pp. 885–886 (1978).

*Primary Examiner*—Aaron Weisstuch

[57] ABSTRACT

A photogalvanic cell containing a set of electrodes immersed in an acidic aqueous electrolyte solution, said solution comprising at least one photo-reducible dyestuff, both higher and lower valent ions of at least one redox couple of metals, and at least one complexing agent for the higher valent ion of the redox couple.

11 Claims, 1 Drawing Figure

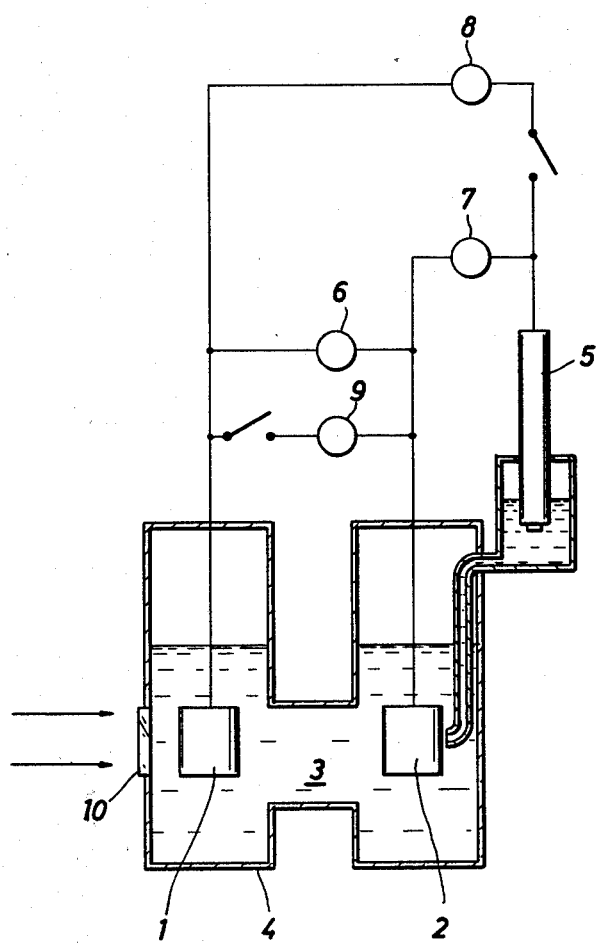

PHOTOGALVANIC CELL COMPRISING COMPLEXING AGENTS

BACKGROUND OF THE INVENTION

The invention relates to a photogalvanic cell based upon light-sensitive materials in solution.

It is known that there exist certain light-sensitive materials for which electrochemical equilibrium in electrolyte solutions is strongly influenced by light. The electrochemical energy state of the materials in darkness is significantly increased upon excitation by photons. It is further known that practical advantage may be taken of this phenomena in a photogalvanic cell, which is a conventional device comprising a set of electrodes immersed in an electrolyte solution containing such light-sensitive materials. When the solution in the vicinity of one electrode in the photogalvanic cell is irradiated with light while the solution in the vicinity of a second electrode is maintained in darkness, the different energy states of electrochemical equilibrium in the light and dark portions of the solution cause a potential difference to be observed between the light and dark electrodes. Furthermore, shifts in electrochemical equilibrium at the electrodes generate an electrical current which may be withdrawn from the cell. in principle, the photogalvanic cell based on light-sensitive materials in solution can be used indefinitely, as its function depends only upon reversible shifts in equilibrium in the cell solution in response to light energy, and no material within the cell is consumed as fuel.

Such photogalvanic cells based upon light-sensitive materials in solution are to be distinguished from photovoltaic cells based on inorganic semiconductors, which are purely solid state electronic devices, from photogalvanic cells with light-sensitive electrodes, and from fuel generating cells such as those producing the decomposition of water into $H_2$ and $O_2$ which can be removed and stored as a fuel supply.

The conventional photogalvanic cell based on light-sensitive materials in solution typically comprises an aqueous electrolyte solution containing an organic dyestuff, a metal redox couple, and a common acid. The instant invention specifically relates to the addition to the electrolyte solution in such photogalvanic cells of one or more complexing agents for the higher valent ion of the metal redox couple present. It has been previously proposed to add a complexing agent to a mixture of a photo-reducible dyestuff and a metal redox couple. (See K. G. Mathai and E. Rabinowitch, *J. Phys. Chem.* 66 (1962), p. 663). However, this earlier work was concerned with the irreversible storage of energy through separation of high energy state products by precipitation of the metal ion complex, not with the use of such agents in a reversible photogalvanic cell.

SUMMARY OF THE INVENTION

It has now been found that the addition of certain complexing agents to a photogalvanic cell based on light-sensitive materials in solution results in a large increase in the conversion of light energy into electricity by the cell. One or more of the complexing agents are added to the aqueous electrolyte solution of the cell, which solution also comprises an organic dyestuff, a metal redox couple and a common acid. The complexing agent is one capable of forming complexes with the higher valent ion of the metal redox couple in the cell solution. In the operation of the photogalvanic cell according to the invention, comprising the complexing agent, the voltage difference between the two cell electrodes may be increased by a factor of 25 to 50, and the power output of the cell increased by an even greater factor, over conventional cell performance in the absence of such complexing agents.

DESCRIPTION OF THE PREFERRED EMBODIMENTS

A typical example of conventional photogalvanic cells based on light-sensitive materials in solution is one in which the aqueous acidic electrolyte solution of the cell comprises the organic dyestuff thionine and the metal redox couple $Fe^{2+}/Fe^{3+}$. Acids commonly used in the cell include HCl, $H_2SO_4$, $HClO_4$, $HNO_3$, and $H_3PO_4$. The thionine/ferrous system works best at pH 1–4 and is highly reversible when operated under virtually oxygen-free conditions, i.e., with less than 10 ppm dissolved free oxygen in the electrolyte solution. While an explanation of the theory behind the operation of the invention is not fully developed, some indication of the basic phenomena involved can be given utilizing this thionine/ferrous system as a model.

The thionine (Th)/ferrous (Fe) system exists in an equilibrium represented in a very simplified manner by

$$Th + Fe^{2+} \rightarrow Th^- \text{ and } Fe^{3+} \quad \text{(I),}$$

wherein $Th^-$ is intended to represent both reduced forms of thionine, i.e., semithionine and leukothionine. Light sensitivity of the system is illustrated by a shift of the reaction (I) equilibrium to the left in the dark and a shift to the right when the system is exposed to light. In a photogalvanic cell, it is generally believed that the reaction at the light electrode can be expressed as

$$Th^- \rightarrow Th + e^- \quad \text{(II),}$$

and that at the dark electrode as

$$Fe^{3+} + e^- \rightarrow Fe^{2+} \quad \text{(III).}$$

A negative potential is observed at the light electrode relative to that at the dark electrode and current may be drawn from the cell. However, the reaction

$$Fe^{3+} + Th^- \rightarrow Fe^{2+} + Th \quad \text{(IV)}$$

is found to occur in the dark solution away from the interface with the electrode. This dark bulk reaction is responsible for a significant decrease in the efficiency of the conversion of light to electricity within the cell. Only a portion of the high energy $Th^-$ and $Fe^{3+}$ products can be utilized for electricity production at the electrodes. One or more complexing agents added to the cell solution according to this invention might suppress these harmful dark bulk reactions by specifically forming complexes with the higher valent ion of the redox couple.

In addition to thionine, numerous other dyestuffs are suitable for use in the photogalvanic cell of the invention, including other phenothiazine dyes, pheno-oxazine or phenoselanine dyes, or chlorophyll. Metals suitable used in the cell include Fe, Cu, Ni, Co, Ru, Rh, and Pb. The acid component of the cell is typically HCl, $H_2SO_4$, $HClO_4$, $HNO_3$, $H_3PO_4$, or the like. A common organic solvent, for instance, acetonitrile, may be present in the cell solution in a concentration of a few percent for the purpose of enhancing solubility of the dyestuff in the electrolyte solution.

Very good performance has been obtained in the photogalvanic cell according to the invention when a fluoride ion is used as the complexing agent. An increase in the power output of the cell by a factor of more than 500 has been observed for practical light intensities when fluoride ions were added to the conventional cell. Similar effects have been observed with phosphate ions, citrate ions, oxalate ions and 2-aminopropionate ions. A great number of other agents are known to be capable of complexing with the higher valent ions of metal couples in solution and may be suitably employed in the photogalvanic cell of the invention. Combinations of multiple complexing agents may be used as well. It is preferred that the molar concentration of the complexing agent be between 0.1 and 50 times that of the ferric ions in the electrolyte solution of the cell.

Apart from the composition of the electrolyte solution, the photogalvanic cell apparatus of the invention may be designed, constructed and operated in accord with principles recognized in the art. The exact nature of such elements as the electrodes, the cell enclosure, and the light source are not critical to the performance of the apparatus. It is to be recognized, however, that the operation of the cells is limited, in a known manner which does not require particular elaboration herein, with respect to response of the dyestuffs to light only in certain restricted absorption bands.

The invention is further elucidated by reference to the drawing, which illustrates a typical photogalvanic cell based on light-sensitive materials in solution and represents in particular the apparatus with which experimental results disclosed in the following Examples were obtained. Two electrodes, 1 and 2, are immersed in the electrolyte solution 3 contained within closed cell walls 4. A standard calomel electrode 5 serves as a potential reference. Voltmeters 6, 7, and 8 and a current meter 9, for determining voltage, current, and power generated by the cell, are indicated. The solution near electrode 1, the light electrode, is irradiated through window 10. Electrode 2 is maintained in darkness during operation of the apparatus.

The apparatus set out by the FIGURE was utilized to obtain experimental evidence of the performance of the invention. In the particular embodiment of the photogalvanic cell employed in the experimental program, the electrodes were made of small-mesh platinum wire netting or small platinum plates, each electrode being square with a surface area of 2.25 cm². The window had a surface area of 0.5 cm². The electrodes were placed parallel to the beam of light. Before their use, the electordes were cleaned in one normal $H_2SO_4$ by the conventional cyclic voltammetric technique.

EXAMPLE 1

The photogalvanic cell described above was charged with an aqueous electrolyte solution having the following composition:

| | |
|---|---|
| Thionine | $1.0 \times 10^{-4}$ mol/l |
| $Fe^{2+}$(as sulfate) | $25 \times 10^{-3}$ mol/l |
| $Fe^{3+}$(as sulfate) | $0.5 \times 10^{-3}$ mol/l |
| pH = 1.7 (by addition of $H_2SO_4$). | |

A series of experiments were carried out to examine the performance of the cell upon the addition to the electrolyte solution of one of five different complexing agents, e.g., NaF, $Na_3PO_4$, sodium citrate, sodium oxalate, and 2-aminopropionic acid; results are given in Tables I-V respectively. Voltage, current, and power delivered by the cell were observed for different quantities of addition of the complexing agent and for different light intensities.

The symbols used in the Tables are defined as follows:

Io = intensity of incident light for wavelengths between 510–610 nm

Ia = intensity of light absorbed by the solution $V_{dl}$ = voltage difference between dark and light electrodes (meter 6)

$i_{max}$ = maximum current through meter 9.

$P_{max}$ = maximum power delivered by the cell.

For comparison it is mentioned that Io = 2 mW/cm² represents sunlight at cloudy sky and Io = 15 mW/cm² bright sunshine, both intensities between 510–610 nm.

Table I

| Io mW/cm² | Ia mW | $V_{dl}$ mV | $i_{max}$ μA | $P_{max}$ $10^6 \times$ mW | NaF mol/l |
|---|---|---|---|---|---|
| 18.2 | 2 | 0.8 | 0.8 | 0.16 | 0 |
| 18.2 | 1.5 | 5.4 | 4.4 | 5.95 | $1.0 \times 10^{-3}$ |
| 18.2 | 1 | 20.5 | 14.2 | 72.6 | $2.5 \times 10^{-3}$ |
| 18.2 | 0.5 | 48.7 | 23.1 | 271 | $5.0 \times 10^{-3}$ |
| 53.3 | 8 | 7.8 | 9.1 | 17.7 | 0 |
| 53.3 | 7 | 25.0 | 19.0 | 113.5 | $1.0 \times 10^{-3}$ |
| 53.3 | 5.5 | 47.3 | 30.7 | 363 | $2.5 \times 10^{-3}$ |
| 53.3 | 1.5 | 79.0 | 40.5 | 800 | $5.0 \times 10^{-3}$ |
| 147 | 20 | 26.4 | 30.8 | 194.5 | 0 |
| 147 | 16 | 46.1 | 42.0 | 486 | $1.0 \times 10^{-3}$ |
| 147 | 13 | 76.6 | 53.0 | 1017 | $2.5 \times 10^{-3}$ |
| 147 | 4 | 96.7 | 56.2 | 1365 | $5.0 \times 10^{-3}$ |

Table II

| Io mW/cm² | $V_{dl}$ mV | $i_{max}$ μA | $P_{max}$ $10^6 \times$ mW | $Na_3PO_4$ mol/l |
|---|---|---|---|---|
| 18.2 | 0.26 | 0.4 | 0.03 | 0 |
| 18.2 | 3.7 | 4.6 | 4.43 | $2.0 \times 10^{-4}$ |
| 18.2 | 16.1 | 15.0 | 64.0 | $5.0 \times 10^{-4}$ |
| 53.3 | 3.9 | 6.5 | 6.7 | 0 |
| 53.3 | 13.1 | 17.5 | 60.5 | $2.0 \times 10^{-4}$ |
| 53.3 | 39.8 | 33.8 | 355 | $5.0 \times 10^{-4}$ |
| 147 | 12.6 | 20.6 | 68.5 | 0 |
| 147 | 26.8 | 35.4 | 250 | $2.0 \times 10^{-4}$ |
| 147 | 67.1 | 50.8 | 900 | $5.0 \times 10^{-4}$ |
| 735 | 52.2 | 73.0 | 377 | 0 |
| 735 | 52.2 | 73.0 | 1006 | $2.0 \times 10^{-4}$ |
| 735 | 107.7 | 76 | 2160 | $5.0 \times 10^{-4}$ |

Table III

| Io mW/cm² | $V_{dl}$ mV | $i_{max}$ μA | $P_{max}$ $10^6 \times$ mw | Na-citrate mol/l |
|---|---|---|---|---|
| 18.2 | 0.12 | 0.17 | 0.02 | 0 |
| 18.2 | 0.60 | 0.59 | 0.09 | $1.0 \times 10^{-3}$ |
| 53.3 | 2.65 | 4.0 | 2.65 | 0 |
| 53.3 | 7.5 | 6.9 | 12.9 | $1.0 \times 10^{-3}$ |
| 147 | 10.8 | 16.5 | 44.6 | 0 |
| 147 | 22.9 | 20.0 | 114.5 | $1.0 \times 10^{-3}$ |

Table IV

| Io mW/cm² | $V_{dl}$ mV | $i_{max}$ μA | $P_{max}$ $10^6 \times$ mW | Na-oxalate mol/l |
|---|---|---|---|---|
| 18.2 | 1.9 | 1.3 | 0.64 | 0 |
| 18.2 | 8.9 | 2.0 | 4.8 | $8 \times 10^{-4}$ |
| 45.0 | 8.0 | 5.0 | 10.8 | 0 |
| 45.0 | 21.0 | 5.6 | 31.8 | $8 \times 10^{-4}$ |
| 180.2 | 27.5 | 19.0 | 141 | 0 |

Table IV-continued

| Io mW/cm² | $V_{dl}$ mV | $i_{max}$ μA | $P_{max}$ $10^6 \times$ mW | Na-oxalate mol/l |
|---|---|---|---|---|
| 180.2 | 54.0 | 16.0 | 233 | $8 \times 10^{-4}$ |

Table V*

| Io mW/cm² | $V_{dl}$ mV | $i_{max}$ μA | $P_{max}$ $10^6 \times$ mW | 2-aminopropionic acid mol/l |
|---|---|---|---|---|
| 36.4 | 3.3 | 1.3 | 1.1 | 0 |
| 36.4 | 5.0 | 1.6 | 2.1 | $2.5 \times 10^{-3}$ |
| 36.4 | 6.0 | 1.9 | 3.0 | $5.0 \times 10^{-3}$ |
| 90.1 | 10.5 | 4.0 | 11.3 | 0 |
| 90.1 | 14.6 | 4.9 | 19.3 | $2.5 \times 10^{-3}$ |
| 90.1 | 18.0 | 5.4 | 26.2 | $5.0 \times 10^{-3}$ |
| 180.2 | 21.8 | 8.4 | 49.4 | 0 |
| 180.2 | 28.7 | 9.8 | 75.9 | $2.5 \times 10^{-3}$ |
| 180.2 | 34.6 | 10.0 | 93.4 | $5.0 \times 10^{-3}$ |
| 360.4 | 40.0 | 15.2 | 164 | 0 |
| 360.4 | 49.8 | 16.2 | 218 | $2.5 \times 10^{-3}$ |
| 360.4 | 57.3 | 15.5 | 240 | $5.0 \times 10^{-3}$ |

*These experiments were carried out at a pH value of 3.2

It is pointed out that the reproducibility of the performance of the cell at very low $V_{dl}$-values is rather poor due to surface effects of the electrodes which are very difficult to avoid. It is nevertheless clear that addition of complexing agents to the electrolyte solution of the photogalvenic cell has an important effect on the conversion by the cell of light energy into electrical energy. This effect is observed at various levels of light intensity.

It is observed that the absorption of light (Ia) decreases with increasing concentration of complexing agent. This leads to a further increase in the efficiency of the cell based on light absorbed (Ia). This phenomenon may be exploited by increasing the light reaction path in the solution.

EXAMPLE 2

A series of experiments were carried out with the addition of various quantities of NaF, as complexing agent, to the following electrolyte solution:

| | |
|---|---|
| Thionine | $1.0 \times 10^{-4}$ mol/l |
| $Fe^{2+}$ (as sulfate) | $25 \times 10^{-3}$ mol/l |
| $Fe^{3+}$ (as sulfate) | $0.5 \times 10^{-3}$ mol/l |
| pH = 1.7 (by addition of $H_2SO_4$). | |

The concentration of $Fe^{3+}$ in the electrolyte solution in Example 2 was three times that used in Example 1. Table VI indicates the energy conversion results obtained utilizing this electrolyte solution with various additions of complexing agent NaF at several light intensities.

TABLE

| Io mW/cm² | $V_{dl}$ mV | $i_{max}$ μA | $P_{max}$ $10^6 \times$ mW | NaF mol/l |
|---|---|---|---|---|
| 36.4 | 0.14 | 0.18 | 0.007 | 0 |
| 36.4 | 1.60 | 1.50 | 0.65 | $1.5 \times 10^{-3}$ |
| 36.4 | 53.0 | 22.3 | 319.1 | $7.5 \times 10^{-3}$ |
| 36.4 | 94.6 | 27.0 | 689.6 | $15.0 \times 10^{-3}$ |
| 90.1 | 1.50 | 2.0 | 0.8 | 0 |
| 90.1 | 7.8 | 7.4 | 15.6 | $1.5 \times 10^{-3}$ |
| 90.1 | 85.6 | 37.0 | 855.1 | $7.5 \times 10^{-3}$ |
| 90.1 | 101.9 | 33.9 | 932.7 | $15.0 \times 10^{-3}$ |
| 180.2 | 4.8 | 6.2 | 8.0 | 0 |
| 180.2 | 18.2 | 17.3 | 85.0 | $1.5 \times 10^{-3}$ |
| 180.2 | 106.4 | 48.5 | 1393.3 | $7.5 \times 10^{-3}$ |
| 180.2 | 109.0 | 37.5 | 1103.6 | $15.0 \times 10^{-3}$ |
| 360.4 | 11.8 | 17.0 | 54.2 | 0 |
| 360.4 | 30.3 | 31.5 | 257.7 | $1.5 \times 10^{-3}$ |
| 360.4 | 118.3 | 59.0 | 1884.5 | $7.5 \times 10^{-3}$ |
| 360.4 | 112.4 | 37.7 | 1144.1 | $15.0 \times 10^{-3}$ |

These results show that a higher $Fe^{3+}$ concentration does not lead to a decrease in $P_{max}$ provided a complexing agent, in this case NaF, is present. It is known that higher $Fe^{3+}$ concentrations without complexing agent promote the rate of the dark bulb reactions mentioned earlier. This means that the beneficial effect of a complexing agent is more pronounced at higher $Fe^{3+}$ concentrations. In fact even higher $P_{max}$ values are found under these circumstances.

EXAMPLE 3

Experiments were carried out with methylene blue instead of thionine as photo-reducible dyestuff with and without fluoride ions as complexing agents. The composition of the electrolyte solution was:

| | |
|---|---|
| methylene blue | $4.9 \times 10^{-5}$ mol/l |
| $Fe^{2+}$ (as sulfate) | $25 \times 10^{-3}$ mol/l |
| $Fe^{3+}$ (as sulfate) | $1.5 \times 10^{-3}$ mol/l |
| pH = 1.7 (by addition of $H_2SO_4$). | |

Results are given in Table VII.

TABLE VII

| Io* mW/cm² | $V_{dl}$ mV | $i_{max}$ μA | $P_{max}$ $10^6 \times$ mW | NaF mol/l |
|---|---|---|---|---|
| 36 | 0.04 | 0.003 | 0.00003 | 0 |
| 36 | 0.5 | 0.08 | 0.011 | $1.6 \times 10^{-3}$ |
| 360 | 0.11 | 0.01 | 0.0003 | 0 |
| 360 | 2.60 | 0.35 | 0.91 | $1.6 \times 10^{-3}$ |
| 720 | 0.37 | 0.06 | 0.022 | 0 |
| 720 | 8.25 | 1.10 | 9.08 | $1.6 \times 10^{-3}$ |
| 1440 | 1.6 | 0.3 | 0.48 | 0 |
| 1440 | 23.45 | 3.3 | 77.3 | $1.6 \times 10^{-3}$ |

*for wavelengths between 610–710 nm

These results indicate that with methylene blue as the photo-reducible dyestuff in the photogalvanic cell the addition of the complexing agent NaF has an important effect on the conversion of light energy into electric energy. A more than 400 times increase in power was observed for practical light intensities.

EXAMPLE 4

A series of experiments were carried out with various additions of sodium fluoride as complexing agent to the following cell solution:

| | |
|---|---|
| Thionine | $3.8 \times 10^{-5}$ mol/l |
| $Fe^{2+}$ (as perchlorate) | $2.5 \times 10^{-2}$ mol/l |
| $Fe^{3+}$ (as perchlorate) | $1.2 \times 10^{-3}$ mol/l |
| pH = 1.7 (by addition of $HClO_4$). | |

Results are provided in Table VIII.

TABLE VIII

| Io mW/cm² | $V_{dl}$ mV | $i_{max}$ μA | $P_{max}$ $10 \times$ mW | NaF mol/l |
|---|---|---|---|---|
| 18.2 | 0.3 | 0.03 | 0.009 | 0 |
| 18.2 | 3.0 | 2.92 | 23.2 | $1.2 \times 10^{-2}$ |

TABLE VIII-continued

| $I_o$ mW/cm$^2$ | $V_{dl}$ mV | $i_{max}$ μA | $P_{max}$ 10 × mW | NaF mol/l |
|---|---|---|---|---|
| 53.3 | 1.0 | 0.7 | 0.19 | 0 |
| 53.3 | 76.5 | 8.4 | 171 | $1.2 \times 10^{-2}$ |
| 90.1 | 2.4 | 1.8 | 1.15 | 0 |
| 90.1 | 93.5 | 11.5 | 287 | $1.2 \times 10^{-2}$ |
| 147 | 6.3 | 4.7 | 7.84 | 0 |
| 147 | 110.6 | 16.9 | 495 | $1.2 \times 10^{-2}$ |

Again, it is noted that the addition of the complexing agent has an important effect on the conversion of light energy into electric energy, increasing the efficiency by a factor of about 900.

We claim as our invention:

1. A reversible photogalvanic cell for use in the conversion of light energy into electricity containing a set of electrodes immersed in an acidic aqueous electrolyte solution, said set of electrodes comprising at least one electrode which is adapted to be maintained in a light-irradiated portion of the solution and at least one electrode which is adapted to be maintained in a dark portion of the solution, and said solution comprising (a) at least one photo-reducible dyestuff, (b) both higher and lower valent ions of at least one redox couple of metals, and (c) at least one complexing agent for the higher valent ion of the redox couple selected from the class consisting of fluoride ion, phosphate ion, citrate ion, oxalate ion, and 2-aminopropionate ion.

2. The photogalvanic cell according to claim 1, in which the complexing agent is fluoride ion.

3. The photogalvanic cell according to claim 1, in which the complexing agent is phosphate ion.

4. The photogalvanic cell according to claim 1, in which the complexing agent is citrate ion.

5. The photogalvanic cell according to claim 1, in which the complexing agent is oxalate ion.

6. The photogalvanic cell according to claim 1, in which the complexing agent is 2-aminopropionate ion.

7. The photogalvanic cell according to claim 1, in which combinations of said selected complexing agents are present in the solution.

8. The photogalvanic cell according to claim 1, in which the molar concentration of the complexing agent in the solution is 0.1–50 times that of the higher valent metal ion of the redox couple in the solution.

9. The photogalvanic cell according to claim 1, in which the higher and lower valent ions of the redox metal couple are iron of valence +3 and +2, respectively.

10. The photogalvanic cell according to claim 9, in which the photo-reducible dyestuff is thionine.

11. The photogalvanic cell according to claim 9, in which the dyestuff is methylene blue.

* * * * *